(12) United States Patent
Byun et al.

(10) Patent No.: US 11,918,148 B2
(45) Date of Patent: Mar. 5, 2024

(54) HANDLING OF BEVERAGE

(71) Applicant: SOCIETE DES PRODUITS NESTLE S.A., Vevey (CH)

(72) Inventors: Da Mi Byun, Lausanne (CH); Bertrand Guyon, Pontarlier (FR); Michal Pivrnec, Boussens (CH)

(73) Assignee: Societe des Produits Nestle S.A., Vevey (CH)

( * ) Notice: Subject to any disclaimer, the term of this patent is extended or adjusted under 35 U.S.C. 154(b) by 772 days.

(21) Appl. No.: 17/042,418

(22) PCT Filed: Apr. 29, 2019

(86) PCT No.: PCT/EP2019/060854
§ 371 (c)(1),
(2) Date: Sep. 28, 2020

(87) PCT Pub. No.: WO2019/211213
PCT Pub. Date: Nov. 7, 2019

(65) Prior Publication Data
US 2021/0015304 A1  Jan. 21, 2021

(30) Foreign Application Priority Data
Apr. 30, 2018 (EP) ................................. 18170166

(51) Int. Cl.
*A47J 43/07* (2006.01)
*A47J 27/00* (2006.01)
(Continued)

(52) U.S. Cl.
CPC ......... *A47J 43/0716* (2013.01); *A47J 27/004* (2013.01); *A47J 43/046* (2013.01); *A47J 43/288* (2013.01); *A47J 31/407* (2013.01)

(58) Field of Classification Search
CPC .... A47J 43/0716; A47J 43/288; A47J 43/046; A47J 27/004; A47J 31/407
(Continued)

(56) References Cited

U.S. PATENT DOCUMENTS 2,066,997 A   1/1937 Mueller
D405,661 S  *  2/1999 Erickson .................. D7/688
(Continued)

FOREIGN PATENT DOCUMENTS

EP   2289375   3/2011
EP   2918208   9/2015

*Primary Examiner* — Omar Flores Sanchez
(74) *Attorney, Agent, or Firm* — K&L Gates LLP

(57) ABSTRACT

A system (10,20) for processing and handling a liquid food substance, comprises: a processing device (20) that has a processing cavity (21) in which the liquid food substance is processed (21), the processing cavity (21) having an opening (22) that is configured so that the liquid food substance is removable from the processing cavity (21) via the opening (22); and a handling arrangement (10) that is configured to handle the liquid food substance when the liquid food substance is collected in an external user-recipient, such as a cup or a mug, after its processing in the processing cavity (21). The handling arrangement (10) is seizable by a human hand. The handling arrangement (10) is separate from the processing device (20) and from the external user-recipient and is freely movable relative thereto. When seized and operated by the human hand, the handling arrangement (10) is configured: to withdraw such liquid food substance upon processing from the processing cavity (21) and to deliver it into the external user-recipient; and/or to shape such processed liquid food substance upon collection in the external user-recipient.

13 Claims, 1 Drawing Sheet

(51) Int. Cl.
*A47J 43/046* (2006.01)
*A47J 43/28* (2006.01)
*A47J 31/40* (2006.01)

(58) Field of Classification Search
USPC .............................................. 99/323.3, 323
See application file for complete search history.

(56) References Cited

U.S. PATENT DOCUMENTS

| | | | |
|---|---|---|---|
| 6,966,689 B2* | 11/2005 | Daniels, Jr. | A47J 43/0722 366/195 |
| 7,648,264 B2* | 1/2010 | Breviere | A47J 43/0716 366/205 |
| 9,474,419 B2* | 10/2016 | Schneider | A47J 43/28 |
| 2004/0134357 A1* | 7/2004 | Cai | A47J 27/2105 99/279 |
| 2004/0264294 A1* | 12/2004 | Pryor, Jr. | A47J 43/0716 366/205 |
| 2014/0104974 A1 | 4/2014 | Choi et al. | |
| 2014/0133263 A1* | 5/2014 | Schneider | G01F 19/002 366/129 |
| 2015/0272362 A1* | 10/2015 | Lisek | A47J 43/288 294/7 |
| 2018/0140137 A1* | 5/2018 | Barnard | A47J 43/046 |
| 2019/0328167 A1* | 10/2019 | Abdo | A47J 43/0465 |
| 2021/0235937 A1* | 8/2021 | Wunderle | A47J 43/288 |

* cited by examiner

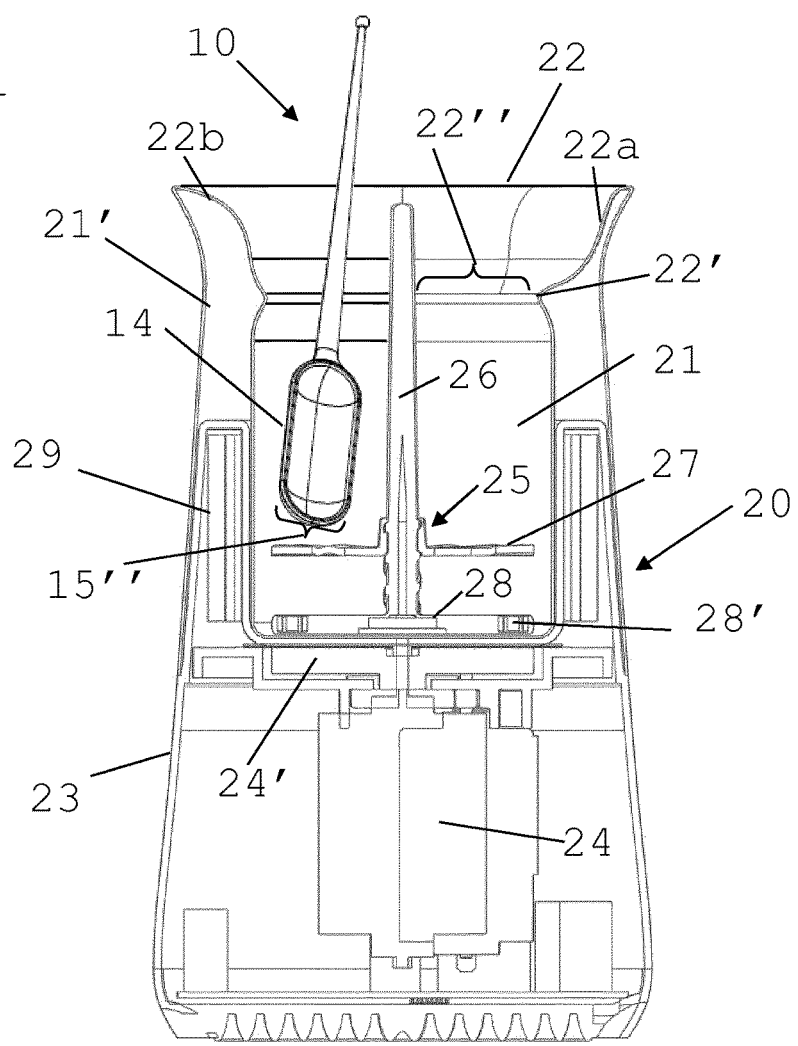
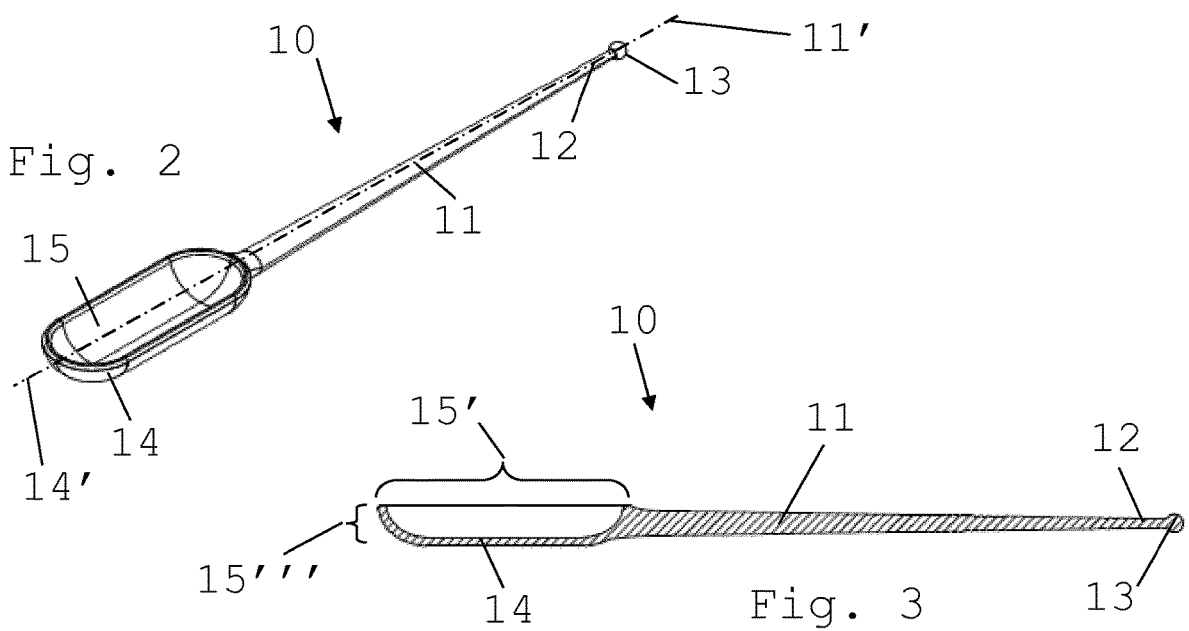

HANDLING OF BEVERAGE

CROSS REFERENCE TO RELATED APPLICATIONS

The present application is a National Stage of International Application No. PCT/EP2019/060854, filed on Apr. 29, 2019, which claims priority to European Patent Application No. 18170166.5, filed on Apr. 30, 2018, the entire contents of which are being incorporated herein by reference.

FIELD OF THE INVENTION

The field of the invention pertains to machines for processing a liquid food substance, such as milk or a milk-containing substance, having a food processing cavity and to the handling of the food substance processed in the cavity and to the handling of liquid food substance upon processing in such machine. For instance, the machine is provided with an impeller and/or a thermal management arrangement to process the food substance.

BACKGROUND ART

Speciality beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

Milk-based froth can be prepared in a mechanical stirring appliance. Regular cleaning of the tank of the appliance needs to be envisaged in order to remove any solid food residue. In addition, heating the milk has a tendency to increase the extent to which cooked or burnt proteins are deposited on and adhere to the surfaces.

U.S. Pat. No. 6,318,247 relates to an appliance for preparing hot beverages or food with stirring such as hot chocolate, for example. Other devices for stirring food products are described in patent documents WO 2004/043213 or DE 196 24 648. Stirring systems with a magnetic engagement type are described in documents U.S. Pat. No. 2,932,493, DE 1 131 372, U.S. Pat. Nos. 4,537,332 and 6,712,497. DE 89 15 094 relates to a refrigerated pot for dispensing a milk-based beverage. U.S. Pat. No. 3,356,349 discloses a stirring device that has a heated tank, magnetic drive means positioned under the tank for driving a hub located in the middle of the tank.

Further examples of beverage processing appliances using stirring systems, in particular magnetically driven stirring systems, are disclosed in WO 2016/202814, WO 2016/202815, WO 2016/202816, WO 2016/202817, PCT/EP17/082208 and PCT/EP17/082211.

An improved appliance for preparing froth from a milk-based liquid or milk has been proposed in WO 2006/050900, WO 2008/142154, WO 2011/039222, WO 2011/039224 and WO 2017/216133. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing. In WO 2010/023313 a steam source is associated with the stirring effect.

Heat can be provided into the processing tank by using an induction system, e.g. as disclosed in EP2017203199.

It has been proposed, as described in WO 2009/074555 and WO 2011/144647, to provide a coffee machine with this type of milk conditioning tank.

An architecture to favour the evacuation of unwanted heat generated by the operation of electric components of the milk frothing appliance has been disclosed in WO 2016/202818. As disclosed in PCT/EP17/082212 and EP2017203205, such appliance can also be fitted with one or more fan coolers.

To dispense the processed beverage, the tank can be fitted with a dispensing spout along which beverage may be drained out of the tank when the tank is inclined.

Such a tank is disclosed in PCT/EP17/082208. The spout may be used simply to dispense the processed beverage or, additionally, to provide special designs, patterns or artistic shapes, in the dispensed beverage, by skillfully moving the spout and the tank over the user-receptacle (e.g. a cup or a mug) collecting the processed beverage.

There is still a need to facilitate the dispensing beverage from such appliances.

SUMMARY OF THE INVENTION

It is a preferred object of the present invention to provide an arrangement for a device for processing a food substance to assist the handling of the food substance upon processing.

The invention thus relates to a system for processing and handling a liquid food substance, such as milk or a milk-based substance. The liquid food substance can be aqueous, e.g. containing coffee and/or chocolate and/or cacao.

The system includes a processing device that has a processing cavity in which the liquid food substance is processed. The processing cavity has an opening that is configured so that the liquid food substance is removable from the processing cavity via the opening. For instance, the opening is covered and/or closed by a lid and/or delimits one or more spouts e.g. spouts for dispensing foam or liquid. For example, the opening delimits different kind of spouts, e.g. a spout for dispensing gross foam and a spout for dispensing fine foam.

The processing cavity can have a removable lid for covering and/or closing the processing cavity, e.g. as taught in WO 2008/142154.

The processing cavity can be substantially cup-shaped or bowl-shaped or cylinder-shaped, delimited by one or more sidewalls that is/are substantially upright and by a bottom wall that is substantially flat or curved.

The system includes a handling arrangement that is configured for handling the liquid food substance when the liquid food substance is collected in an external user-recipient, such as a cup or a mug, after processing of the liquid food substance in the processing cavity.

The processing device may be a standalone machine, e.g. directly pluggable to the mains via an electric cord, or may be integrated in a food processor arranged to process other food items or to carry out different food conditioning processes, the food processor itself being generally pluggable to the mains via an electric cord whereas the processing device is a sub-part of the food processor. Such a food processor may be a beverage maker, such as a coffee maker, e.g. a beverage maker configured to prepare a beverage (such as coffee) from an ingredient capsule.

The processing device of the invention may advantageously be configured to froth and/or heat and/or cool milk and optionally be associated, as a standalone machine or as an integrated machine, into a coffee maker. Standalone machines and integrated associations of milk frothing machines and coffee makers are for example disclosed in WO 2006/050900, WO 2008/142154, WO 2009/074550, WO 2009/074555, WO 2010/023312 and WO 2010/023313. The processing device can be a milk frother which operates by incorporating finely divided gas bubbles, e.g. air bubbles, into milk. When the processing device is configured for incorporating gas bubbles into milk, it may include an operating mode without incorporation of gas bubbles.

The processing device of the invention can be configured for processing a liquid food substance, such as milk or a milk-based substance The handling arrangement is seizable by a human hand. The handling arrangement is separate from the processing device and from the above external user-recipient and is freely movable relative thereto. When seized and operated by the human hand, the handling arrangement is configured: to withdraw such liquid food substance upon processing from the processing cavity and to deliver it into the external user-recipient; and/or to shape such processed liquid food substance upon collection in the external user-recipient.

The handling arrangement may have an elongated handle seizable by the above human hand, such as a handle in the shape of cylinder, a cone, a prism, a pyramid and/or a bar.

The elongated handle can have a length in the range of 5 to 15 cm, such as in the range of 7.5 to 12.5 cm, and/or a maximum width in the range of 1 to 15 mm such as in the range of 2 to 7 mm, e.g. in the range of 2.5 to 5 mm.

The handle may have an end portion, such as a portion tapered towards its end for instance tapered at a small angle typically in the range of 0.5 to 10 deg. such as 1 to 5 deg. The end portion may be configured to enter and dip in the processed liquid food substance in the external user-recipient and to form a design or pattern at a surface of the processed liquid food substance when the end portion is moved in the processed liquid food substance.

The handle can have a member, such as a sphere, ball, ellipsoid, ovoid or polyhedron, that forms a free end of the handle, the member being mechanically connected to an extremity of the end portion, e.g. fixedly or integrally connected with the extremity, the member being wider than the end portion next to the member.

Such a member at the handle's free end may be used to prevent or inhibit dripping of remanent processed liquid food substance from the handle's end portion at removal of the handle's end portion from the liquid food substance contained in the external user-recipient.

The member can be wider than the end portion next to the member by at most a factor 3, such as wider by a factor in the range of 1.3 to 2.5.

The member may have a maximum diameter in cross-section substantially orthogonal to a longitudinal direction of the end portion in the range of 1 to 4 mm, such as 1.5 to 3 mm.

The end portion can have a cross-sectional diameter in the range of 0.5 to 3 mm, such as 1 to 2 mm.

The handling arrangement may include a bowl delimiting a bowl cavity configured to collect such liquid food substance upon processing in the processing cavity and to withdraw the collected substance from the processing cavity.

The bowl may be elongated in a direction substantially parallel to a longitudinal direction of the elongated handle.

The elongation of the bowl may facilitate introduction of the bowl into the processing cavity, especially when the processing cavity has a narrowing or neck or otherwise a narrow passage, while providing a sufficient collecting volume in the bowl cavity to enable noticeable removal of processed liquid food substance from the processing cavity.

The bowl can have a maximum length and a maximum width with a ratio of the maximum length over the maximum width in the range of 2 to 10, such as 3 to 7, e.g. 4 to 6. The bowl can have a maximum depth with a ratio of the maximum width over the maximum depth in the range of 0.3 to 3 e.g. 0.5 to 2.

The bowl may have a or the maximum length in the range of 2.5 to 10 cm, such as 3 to 7 cm, e.g. 4 to 6 cm.

The bowl may have a substantially oval or semi-ovoidal or semi-ellipsoidal shape.

The processing cavity may delimit a restricting passage, such as the opening or a narrowing underneath the opening, that has a transverse maximum dimension for allowing a passage of the handling arrangement into the processing cavity to withdraw the processed liquid food substance, the bowl having a or the above maximum width with a ratio of the maximum width over the transverse maximum dimension in the range of 0.2 to 0.95, such as 0.3 to 0.85, e.g. 0.5 7o 0.7. The restricting passage can be further delimited by an upright axle of a processing tool, such as a rotary driven processing tool and/or an axle that extends substantially along a central upright direction of the processing cavity.

The processing device may include a base for removably receiving a processing receptacle delimiting the processing cavity. The processing receptacle can be removable from the base for dispensing the liquid food substance upon processing and/or for cleaning the receptacle.

The processing device may have a base that has one or more walls forming a seat for removably receiving the container.

The base may have a powered cavity, e.g. a cavity powered by the mains via an electric cord, that is adjacent the container. The base cavity may include a thermal conditioner for generating heat in the food cavity (heating the cavity) and/or for removing heat from the food cavity (cooling the cavity). The base cavity may include an actuator, e.g. a motor, for driving the liquid food substance in the container.

Actuators e.g. motors, control units, user-interfaces, AC/DC converters can all be comprised in the base, e.g. in the powered cavity.

The processing receptacle can be mechanically and/or electrically passive.

By providing a removable processing receptacle which is mechanically and/or electrically passive (optionally with a lid that is equally passive), it can easily be cleaned, e.g. in a dishwater, without any risk of damaging electric and/or mechanic components.

The same result can be achieved when the removable processing receptacle is provided with a control cavity, e.g. containing mechanical and/or electric control active constituents such as actuators and signal processing units, which cavity has no movable access panel sealed off by a rubber, silicone or like seal that is exposed to early wear, especially when exposed to detergents or soaps used for cleaning. Hence, the same result may be achieved, if the removable processing receptacle contains active components that are contained in an inaccessible confinement cavity, the processing receptacle being for instance entirely moulded and/or welded around such a confinement cavity so that the cavity is completely sunk in the structure of the processing receptacle and separate from the environment outside the processing receptacle with no access from the outside without destroying the processing receptacle. In such circumstances, the processing receptacle may contain in such confined inaccessible cavity an active device, e.g. an RFID-type device or the like.

Examples of such processing receptacles and bases are disclosed in EP17203199.9, PCT/EP17/082211 and WO 2016/202814.

The processing device may include a or the above processing tool in the cavity for imparting an effect onto the liquid food substance in the cavity, e.g. to foam or stir the liquid food substance during processing. The processing tool can have at least one of: a rotary impeller, such as a substantially wavy disc shaped impeller and/or an impeller made of a helicoidal spring element arranged in a loop; and a drive interface, such as a magnetically actuated drive interface including one or more magnetic or ferromagnetic driven elements.

The processing device may include an actuator, such as a motor, for driving a or the above processing tool in the processing cavity. The actuator can be outside the processing cavity and magnetically coupled to the processing tool by an actuator interface including one or more magnetic or ferromagnetic driving elements (e.g. driving the above driven elements).

Examples of suitable processing tools and/or magnetic actuation are disclosed in WO 2006/050900, WO 2008/142154, WO 2016/202814, WO 2016/202815, WO 2016/202816, WO 2016/202817, PCT/EP17/082208 and PCT/EP17/082211.

The processing device may include a thermal conditioner for thermally conditioning the liquid food substance in the processing cavity, such as a heater and/or a cooler, e.g. a resistive or inductive or Peltier conditioner.

Examples of thermal management devices and aids are disclosed in WO 2016/202818, EP2017203199.9 EP2017203205.4 and EP2018164919.5

The processing device, e.g. the removable processing receptacle when present, may have a handle. Examples of suitable handles are disclosed in EP2018164876.7 and EP2018164899.9. The processing device, e.g. the removable processing receptacle when present, may be provided with a gripping surface, for example of the type disclosed in WO 2009/074555.

Another aspect of the invention concerns a use of a handling arrangement for being combined with a processing device to form the system described above.

When reference is made in the present description to an orientation or position relative to the processing device or parts thereof, e.g. "above" or "below" or "vertical" or "horizontal", the orientation or position takes as a reference the position and orientation of the processing device in operation to process the liquid food substance in the processing cavity unless specified otherwise.

BRIEF DESCRIPTION OF THE DRAWINGS

The invention will now be described with reference to the schematic drawings, wherein:

FIG. 1 is a cross-sectional view of a system having a processing device and a handling arrangement in accordance with the invention;

FIG. 2 is a perspective view of the handling arrangement shown in FIG. 1; and FIG. 3 is a cross-sectional view of the handling arrangement shown in FIG. 1.

DETAILED DESCRIPTION

An exemplary embodiment of a system 10,20 according to the invention and of its handling arrangement 10 are illustrated in FIGS. 1 to 3.

System 10,20 is configured for processing and handling a liquid food substance, such as milk or a milk-based substance.

System 10,20 includes a processing device 20 that has a processing cavity 21 in which the liquid food substance is processed 21. Processing cavity 21 has an opening 22 that is configured so that the liquid food substance is removable from processing cavity 21 via opening 22. Opening 22 may be covered and/or closed by a lid and/or may delimit one or more spouts 22a,22b e.g. spouts for dispensing foam or liquid.

System 10,20 includes a handling arrangement 10 that is configured to handle the liquid food substance when the liquid food substance is collected in an external user-recipient, such as a cup or a mug, after processing of the liquid food substance in the processing cavity.

Handling arrangement 10 is seizable by a human hand. Handling arrangement 10 is separate from processing device 20 and from the external user-recipient. Handling arrangement 10 is freely movable relative to processing device 20 and relative to external user-recipient. When seized and operated by the human hand, handling arrangement 10 is configured: to withdraw the liquid food substance upon processing from processing cavity 21 and to deliver it into the external user-recipient; and/or to shape such processed liquid food substance upon collection in the external user-recipient.

Handling arrangement 10 may have an elongated handle 11 seizable by the human hand, such as a handle in the shape of cylinder, a cone, a prism, a pyramid and/or a bar.

Elongated handle 11 can have a length in the range of 5 to 15 cm, such as in the range of 7.5 to 12.5 cm, and/or a maximum width in the range of 1 to 15 mm such as in the range of 2 to 7 mm, e.g. in the range of 2.5 to 5 mm.

Handle 11 may have an end portion 12, such as a portion 12 tapered towards its end, configured to enter and dip in the processed liquid food substance contained in the external user-recipient and to form a design or pattern at a surface of the processed liquid food substance when the end portion 12 is moved in the processed liquid food substance.

Handle 11 may have a member 13, such as a sphere, ball, ellipsoid, ovoid or polyhedron, that forms a free end of handle 11, member 13 being mechanically connected to an extremity of end portion 12, e.g. fixedly or integrally connected with the extremity, member 13 being wider than end portion 12 next to member 13.

Member 13 may be wider than end portion 12 next to member 13 by at most a factor 3, such as wider by a factor in the range of 1.3 to 2.5.

Member 13 can have a maximum diameter in cross-section substantially orthogonal to a longitudinal direction 11' of end portion 12 in the range of 1 to 4 mm, such as 1.5 to 3 mm.

End portion 12 can have a cross-sectional diameter in the range of 0.5 to 3 mm, such as 1 to 2 mm.

Handling arrangement 10 may include a bowl 14 delimiting a bowl cavity 15 configured to collect such liquid food substance upon processing in processing cavity 21 and to withdraw the collected substance from processing cavity 21.

Bowl 14 can be elongated in a direction 14' substantially parallel to a longitudinal direction 11' of elongated handle 11.

Bowl 14 may have a maximum length 15' and a maximum width 15" with a ratio of maximum length 15' over maximum width 15" in the range of 2 to 10, such as 3 to 7, e.g. 4 to 6. Bowl 14 can have a maximum depth 15''' with a ratio of maximum width 15" over maximum depth 15''' in the range of 0.3 to 3, e.g. 0.5 to 2.

Bowl 14 may have a or the above maximum length 15' in the range of 2.5 to 10 cm, such as 3 to 7 cm, e.g. 4 to 6 cm.

Bowl 14 can have a substantially oval or semi-ovoidal or semi-ellipsoidal shape.

Processing cavity 21 may delimit a restricting passage, such as opening 22 or a narrowing 22' underneath opening 22, that has a transverse maximum dimension 22" for allowing a passage of handling arrangement 10 into processing cavity 21 to withdraw the processed liquid food substance. Bowl 14 can have a or the above maximum width 15" with a ratio of maximum width 15" over transverse maximum dimension 22" in the range of 0.2 to 0.95, such as 0.3 to 0.85, e.g. 0.5 7o 0.7. Restricting passage 22' may be further delimited by an upright axle 26 of a processing tool 25, such as a rotary driven processing tool 25 and/or an axle 26 that extends substantially along a central upright direction of processing cavity 21.

Processing device 20 may include a base 23 for removably receiving a receptacle 21' delimiting the processing cavity 21. Receptacle 21' may be removable from base 23 for dispensing the liquid food substance upon processing and/or for cleaning the receptacle.

Processing device 20 may include a or the above processing tool 25 in cavity 21 for imparting an effect onto the liquid food substance in cavity 21 e.g. to foam or stir the liquid food substance during processing. Processing tool 25 can include at least one of: a rotary impeller 27, such as a substantially wavy disc shaped impeller and/or an impeller made of a helicoidal spring element arranged in a loop; and a drive interface 28, such as a magnetically actuated drive interface 28 including one or more magnetic or ferromagnetic driven elements 28'.

Processing device 20 may include an actuator 24, such as a motor, for driving a or the above processing tool 25 in processing cavity 21. Actuator 24 can be outside processing cavity 21 and magnetically coupled to processing tool 25 by an actuator interface 24' that has one or more magnetic or ferromagnetic driving elements (e.g. driving the above driven elements 28').

Processing device 20 may include a thermal conditioner 29 for thermally conditioning the liquid food substance in processing cavity 21, such as a heater and/or a cooler, e.g. a resistive or inductive or Peltier conditioner.

The invention claimed is:

1. A system for processing and handling a liquid food substance, the system comprising:
   a processing device that has a processing cavity in which the liquid food substance is processed, the processing cavity having an opening that is configured so that the liquid food substance is removable from the processing cavity via the opening; and
   a handling arrangement that is configured to handle the liquid food substance when the liquid food substance is collected in an external user-recipient after processing of the liquid food substance in the processing cavity; and
   the handling arrangement is seizable by a human hand, the handling arrangement being separate from the processing device and from the external user-recipient and being freely movable relative thereto,
   wherein the handling arrangement is configured: when siezed and operated by the human hand, to withdraw the liquid food substance upon processing from the processing cavity and to deliver the liquid food substance into the external user-recipient; and/or to shape the processed liquid food substance upon collection in the external user-recipient,
   wherein the handling arrangmenet comprises an elongated handle seizable by the human hand, the handle having an end portion configured to enter and dip in the processed liquid food substance in the external user-recipient and to form a design or pattern at a surface of the processed liquid food substance when the end portion is moved in the processed liquid food substance,
   wherein the handling arrangement comprises a bowl delimiting a bowl cavity configured to collect such liquid food substance upon processing in the processing cavity and to withdraw the collect substance from the processing cavity.

2. The system of claim 1, wherein the elongated handle has a length in the range of 5 cm to 15 cm, and/or a maximum width in the range of 1 cm to 15 mm.

3. The system of claim 1, wherein the handle has a member that forms a free end of the handle, the member being mechanically connected to an extremity of the end portion, the member being wider than the end portion next to the member.

4. The system of claim 3, wherein the member is wider than the end portion next to the member by at most a factor 3.

5. The system of claim 3, wherein the member has a maximum diameter in cross-section substantially orthogonal to a longitudinal direction of the end portion in the range of 1 mm to 4 mm.

6. The system of claim 3, wherein the end portion has a cross-sectional diameter in the range of 0.5 mm to 3 mm.

7. The system of claim 1, wherein the bowl is elongated in a direction substantially parallel to a longitudinal direction of the elongated handle.

8. The system of claim 7, wherein the bowl has a maximum length and a maximum width with a ratio of the maximum length over the maximum width in the range of 2 to 10.

9. The system of claim 7, wherein the bowl has a maximum length in the range of 2.5 cm to 10 cm.

10. The system of claim 1, wherein the processing cavity delimits a restricting passage that has a transverse maximum dimension for allowing a passage of the handling arrangement into the processing cavity to withdraw the processed liquid food substance, the bowl having a maximum width with a ratio of the maximum width over the transverse maximum dimension in the range of 0.2 to 0.95.

11. The system of claim 1, wherein the processing device comprises one or more of:
   a base configured for removably receiving a receptacle delimiting the processing cavity, the receptacle being removable from the base for dispensing the liquid food substance upon processing and/or for cleaning the receptacle;
   a processing tool in the processing cavity configured for imparting an effect onto the liquid food substance in the processing cavity;
   an actuator configured for driving a processing tool in the processing cavity; and a thermal conditioner configured for thermally conditioning the liquid food substance in the processing cavity.

12. The system of claim 10, wherein the restricting passage comprises the opening or a narrowing underneath the opening.

13. The system of claim 11, wherein the actuator comprises a motor.

* * * * *